United States Patent [19]

Shisko

[11] Patent Number: 5,520,777

[45] Date of Patent: May 28, 1996

[54] METHOD OF MANUFACTURING FIBERBOARD AND FIBERBOARD PRODUCED THEREBY

[75] Inventor: Walter S. Shisko, Corbeil, Canada

[73] Assignee: Midnorth Forest Industry Alliance Inc., Canada

[21] Appl. No.: 300,316

[22] Filed: Sep. 2, 1994

Related U.S. Application Data

[63] Continuation-in-part of Ser. No. 202,437, Feb. 28, 1994, abandoned.

[51] Int. Cl.$^6$ ................................ D21J 3/00; B27D 1/00
[52] U.S. Cl. ............................. 162/13; 162/9; 162/164.7; 162/224; 162/225; 162/76; 264/128; 156/307.3; 428/283; 428/326
[58] Field of Search ............................. 162/9, 164.7, 13, 162/225, 224, 20, 26, 25, 60, 158, 165, 76; 156/62.2, 307.3, 314; 264/109, 46.4, 128; 428/283, 326

[56] References Cited

U.S. PATENT DOCUMENTS

| | | | |
|---|---|---|---|
| 3,033,695 | 5/1962 | Glab . | |
| 3,367,828 | 2/1968 | Carter et al. | 162/225 |
| 3,492,388 | 1/1970 | Inglin et al. . | |
| 3,969,460 | 7/1976 | Fremont et al. | 264/109 |
| 4,173,428 | 11/1979 | Roberts | 162/141 |
| 4,393,019 | 7/1983 | Geimer | 264/83 |
| 4,407,771 | 10/1983 | Betzner et al. | 264/115 |
| 4,479,912 | 10/1984 | Bullock | 264/23 |
| 4,609,513 | 8/1986 | Israel | 264/122 |
| 4,828,643 | 5/1989 | Newman et al. | 156/328 |
| 4,935,457 | 6/1990 | Metzner et al. | 524/14 |
| 4,961,795 | 10/1990 | Detletsen et al. | 156/62.2 |
| 5,034,175 | 7/1991 | Safstrom | 264/120 |
| 5,130,419 | 7/1992 | Brown et al. | 530/506 |

FOREIGN PATENT DOCUMENTS

| | | |
|---|---|---|
| 1012274 | 6/1977 | Canada . |
| 1174421 | 9/1984 | Canada . |
| 2025658 | 12/1991 | Canada . |
| 2063115 | 12/1992 | Canada . |
| 0545479 | 6/1993 | European Pat. Off. . |
| 2248246 | 4/1992 | United Kingdom . |

OTHER PUBLICATIONS

T. Anazawa and K. Yamagishi—"Production of Dimensionally Stable Particleboard—Chemical Treatment with Maleic Acid Glycerol Mixture," Hokkaido Forest Products Research Institute, vol. 1, No. 7, 1987—Translation.

*Primary Examiner*—David L. Lacey
*Assistant Examiner*—Jose A. Fortuna
*Attorney, Agent, or Firm*—Barnes & Thornburg

[57] ABSTRACT

In manufacturing fiberboard, it is known to press mixtures of lignocellulosic material and binding agents to form a board product. In this invention, an improved process for manufacturing fiberboard is disclosed including the step of adding a solution of maleic anhydride and glycerol to the lignocellulosic material prior to refining thereof. The binder used is preferably phenolic-formaldehyde resin, in which case postheating may be beneficial.

14 Claims, 1 Drawing Sheet

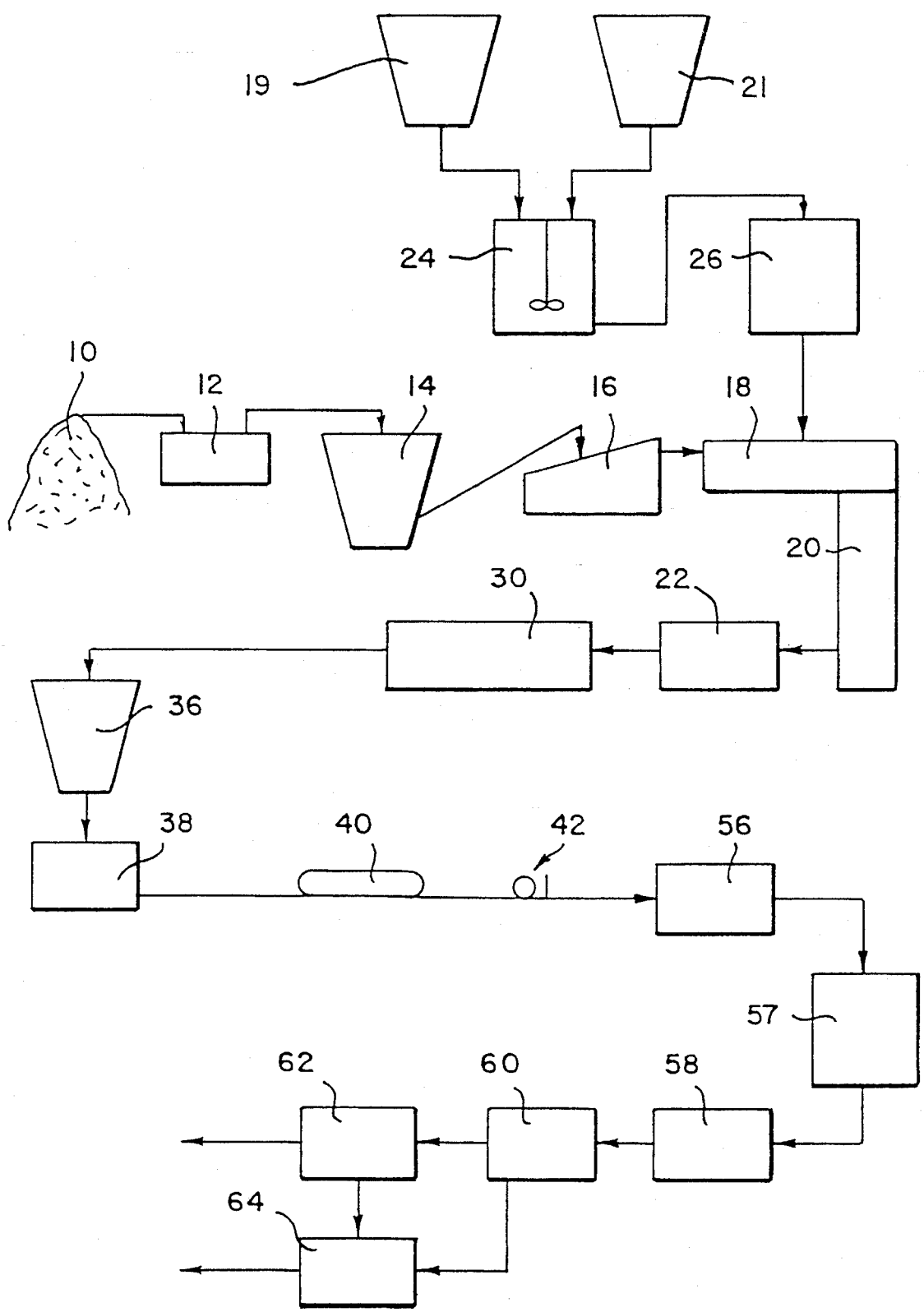

METHOD OF MANUFACTURING FIBERBOARD AND FIBERBOARD PRODUCED THEREBY

This is a continuation-in-part application of Ser. No. 08/202,437, filed Feb. 28, 1994, now abandoned.

BACKGROUND OF THE INVENTION

The present invention relates to a process for manufacturing fiberboard and particularly hardboard and medium density fiberboard having improved dimensional stability properties.

It is known to manufacture board products by consolidating of joining refined lignocellulosic fibers using a chemical binder, pressure and heat. Typical binders are thermosetting resins such as urea-formaldehyde, phenol-formaldehyde, resorcinol-formaldehyde, condensed furfuryl alcohol resins or organic polyioscyanates. The binder is added to the lignocellulosic raw materials or fibers, and the mixture or "furnish" is compressed under heat to bond the material together in a densified form.

Problems encountered in known fiberboards include formaldehyde emissions from the boards, poor water adsorption properties, and the fact that the boards are non-durable under exterior and/or moist service conditions.

Accordingly, the present inventor recognized the need for an economical process for manufacturing fiberboard having improved physical characteristics.

SUMMARY OF THE INVENTION

The present invention provides a process for manufacturing fiberboard in which a solution of maleic acid and glycerol (hereinafter referred to as "MG") is added to wood chips or other lignocellulosic material prior to digesting (cooking under steam pressure) and refining of the wood chips. Addition of relatively low amounts of MG to the wood product prior to digesting and refining facilitates economic production of fiberboard having improved water adsorption properties and results In reduced energy requirements for refining. Accordingly, the present invention provides a process for manufacturing fiberboard from lignocellulosic material comprising the following steps: (a) apply 0.1–5% by weight MG to lignocellulosic material; (b) cook the MG treated lignocellulosic material in steam under pressure; (c) refine the cooked MG treated lignocellulosic material to form fibers; (d) mix the MG treated lignocellulosic material with a binding resin; (e) form the mixture into a mat; and (f) hot press said mat to form a board. The present invention also provides improved fiberboard products manufactured according to the process and a fiberboard made by pressing a mixture of MG impregnated lignocellulosic fibers mixed with a binding resin.

Due to improved water resistance of MG impregnated fibers, the addition of wax or other water repellents is minimized. Optimally only approximately 1% of such water repellent is added to the mixture in the process of the invention.

With respect to the resin, preferably fast curing phenolic-formaldehyde resins are used such as known oriented strandboard ("OSB") face liquid PF resin modified with known phenol-resorcinol formaldehyde or mixed with a known plywood resin. Such mixtures are relatively quick setting phenolic resins. Benefits are realized over the use of urea-formaldehyde since the final product does not emit formaldehyde and since phenolic resins are more stable in exterior or moist conditions. The present invention advantageously utilizes 3–12% phenolic resin and preferably approximately 5% phenolic resin for MDF. With hardboard, it is possible to manufacture the board without phenolic resin, but normally 1–2% will be preferred.

By means of the present invention, an exterior grade MDF product may be manufactured economically with, most preferably, 0.1–1.0% MG, 5–7% thermoplastic phenolic resin and 1% wax.

The process of the present invention is suitable for processing lignocellulosic materials into various types of fiberboards including hardboard and medium density fiberboard. The process described herein by way of example is for manufacturing medium density fiberboard (hereinafter "MDF").

DESCRIPTION OF THE DRAWINGS

The invention is described by way of example with reference to the accompanying drawing which is a flow sheet of a preferred embodiment of the process of the present invention.

DETAILED DESCRIPTION

Referring to the Figure, lignocellulosic raw material 10 comprising chips, shavings, sawdust, lumber mill residue, pallets, etc. is stored in bulk for use as required. Generally, the type of raw material used will depend upon a number of factors including the fiber size and quality required for the particular board product being manufactured, but may be any lignocellulosic material.

The lignocellulosic materials may be passed from bulk storage 10 to a screen 12 if it is necessary to remove fines, bark, etc. The screened lignocellulosic materials are transported from the bulk storage 10 and screen 12 to a storage bin 14 inside the fiberboard plant for immediate use in the process. From the storage bin 14, the lignocellulosic material may be passed to a washer 16 to facilitate removal of extraneous matter. The washer 16 will normally be required to remove sand and dirt when raw wood chips are used in the process.

After passing through the washer 16, the lignocellulosic material is preferably conveyed to an impregnator 18, which may be an impregnation screw, where it is impregnated with a controlled percentage by weight MG in the form of an aqueous solution. Where an impregnation screw is used ensuring high levels of impregnation, a relatively low percentage of MG may be used, typically in the range 0.1–1.0%. Alternatively, the lignocellulosic material may be sprayed or inundated with the aqueous MG solution, or the MG solution may be added to the lignocellulosic material in a digester 20. Where high levels of impregnation are not ensured, such as where MG is sprayed on the lignocellulosic material, higher levels of MG will be required to realize the full benefits of the invention. Typically with low impregnation 1–5% MG must be utilized, and preferably within the range 2–3% MG. As noted, the precise amount of MG required will depend upon the system utilized for applying the MG to the lignocellulosic material.

The aqueous MG solution is prepared by metering maleic anhydride (solid) and glycerol (liquid) from storage bin 19 and tank 21 into a heat jacketed mixer 24 and is heated to approximately 100° C. The ratio of maleic anhydride to glycerol by weight is preferably 3:1 but may range from 2:1 to 9:1.

The length of time during which the maleic anhydride and glycerol are heated and the temperature of the reaction must be controlled to prevent over-processing since over-processing may cause the solution to gel and form water insoluble material. During initial heating the maleic anhydride and glycerol react to form a yellowish brown homogenous liquid. The heat may be maintained for a short time after the solution becomes homogeneous to promote further reaction between the maleic anhydride and glycerol.

After heating, the MG semi-condensate is transported to an MG storage tank 26 where it is diluted to a desired concentration, which is preferably approximately 30% MG. The storage time of the aqueous MG solution must be minimized since the solution will gel during storage. Preferably, maximum retention time of the aqueous MG solution prior to addition to the lignocellulosic material is 2 hours.

In a preferred embodiment, the MG is metered from the MG storage tank 26 to the impregnator 18 or other apparatus where the lignocellulosic material is impregnated or mixed with a controlled percent by weight MG. The MG treated lignocellulosic material is then passed to the digester/refiner system which may be of any conventional design. Preferably, a digester and pressurized refiner are utilized.

Referring to the diagram, in a preferred embodiment, the MG treated wood chips are transported from the screw impregnator 18 to a digester 20 where the wood residue is cooked. Cooking of the MG treated wood residue promotes esterification between the MG and the lignocellulose which may or may not be completed in the digester 20. The amount of esterification will depend upon the retention time in the digester 20 and the temperature and pressure used. It has been found that a retention time of 5 minutes at 1000 kPa will suffice, but the time and pressure utilized may be varied.

In the preferred embodiment, the MG treated lignocellulosic material is transported from the digester 20 to a pressurized refiner 22. The defibrator reduces the lignocellulosic material to fiber by attrition. In practice a number of digesters 20 may be used in combination with a number of refiners 22.

The amount of MG added to the lignocellulosic material is within the range 0.1–5% by weight based on the oven dry weight of wood, and as noted, will depend upon the extent of impregnation. Addition of too much MG may interfere with curing of the resin resulting in inferior products and delamination of the boards during post-heating. Addition of too little MG will not allow the full benefits of the invention to be realized.

Molten wax or any other known water repellent (preferably inexpensive products such as "slack wax" which may be obtained from the petroleum industry) may be added to the MG treated lignocellulosic material. The water repellant is preferably metered onto the lignocellulosic material in the refiner 22 but may be added at any time prior to forming of the boards. The wax suitably comprises about 0 to 5% by weight, and preferably approximately 1%, dry solids basis, of the board formulation. Generally, whether or not water repellant is added will depend upon the required characteristics of the final product.

The optimal stage in the process at which the resin is added to the lignocellulosic material will depend upon the type of resin utilized. Generally, any binder known for use in fiberboard products may be utilized. However, with certain fast curing resins, such as urea-formaldehyde, premature curing may be encountered if the resin is added prior to digesting, refining, and cooling and drying of the fibers.

In the preferred embodiment of the invention, medium density fiberboard is manufactured using a phenol-formaldehyde resin. The resin is added to the hot fibers as they emerge from the defibrator 22. Most preferably, a thermoplastic phenolic resin comprising a mixture of different readily available resin products are used, such as OSB face liquid PF resin of Neste Resin mixed with plywood PF resin at a ratio of 7-3 OSB resin to plywood resin by weight, or OSB face liquid PF resin mixed with phenol resorcinol-formaldehyde resin at a 9-1 ratio by weight. A range of 3–12% by weight of the thermoplastic phenolic resin is added to the MG treated lignocellulosic material and preferably 5% or less. The amount of resin which must be added will be less if post-heating is utilized as discussed below. Further, if hardboard applications of the invention, less phenolic resin will be required, generally in the range of 1–1.5%.

The resin is preferably added to the MG treated lignocellulosic material as they emerge from the pressurized refiner 22 in the blow pipes through which the fibers are conveyed to fiber dryers 30 to promote mixing due to the hot, turbulent conditions in the blow pipes.

The hot and moist mixture of MG treated lignocellulosic material, wax and resin (the "furnish") is conveyed to the fiber dryer 30 in order to separate steam from the furnish to reduce the moisture of the fiber to, typically, approximately 6%. While the preferred embodiment includes a fiber dryer, any suitable drying technique may be used.

From the fiber dryer 30 the furnish is conveyed to a storage bin 36 and then to a conventional mat forming station 38. The forming station may be of any convention design. Generally, at the mat forming station, the required amount of furnish is deposited to form a mat of desired thickness.

The mat is then preferably conveyed through a suitable precompressor 40 of any known type.

From the precompressor 40, the precompressed mat may be passed through a sizing substation generally designated 42 having side-trimming apparatus and a saw for cutting the mat into sections of desired dimensions.

After forming, the mat sections are conveyed to a hot press 56 of any conventional design. Typically, the press will be operated at a temperature from 180°–250° C. Preferably, a two stage press cycle is utilized with temperatures of 200° C. in the first stage and 230° C. in the second stage. Retention time in the hot press 56 and the hot press conditions will depend primarily upon the resin utilized and the board dimensions.

In a preferred embodiment, press time is kept to a minimum through the use of post-heating after pressing and is optimally limited to the time necessary to press the mat to the desired thickness and density. Curing of the fiberboard will continue under post-heating since the MG and resin will continue to cure. Accordingly, in the preferred embodiment shown in the Figure, the partially cured board products are conveyed from the hot press 56 in transportable containers 57 to a post-heating oven 58 where the boards are heat treated for one-half–eight hours at approximately 120°–260° C. and preferably approximately 3 hours at 150° C.

The fully cured boards from the oven 58 may then be humidified in a humidity chamber 60 or in any other known manner. Final humidity of the product is typically approximately 5%. The cured and humidified boards are then, where necessary, cut or finished to size at a sawing station 62 and/or sanding station 64 to finish the boards to the required dimensions.

As noted above, the present invention also relates to a fiberboard produced in accordance with the process of the invention. The final fiberboard product of the invention is formed with the following range of ingredients (expressed as a percentage weight of the final product):

cellulosic material 64–92

MG 0.1–5 wax 0.5–5 resin 3–12.

A particularly preferred composition where full impregnation of the lignocellulosic material is realized is:

cellulosic material 88

MG 0.75 wax 1 resin 5.

Known additional conditioning agents such as fire retardants may be added in any known manner.

EXAMPLE 1

Maleic anhydride (solid) and glycerol (liquid) were heated in a water bath at 100° C. The ratio of maleic anhydride to glycerol by weight was 3 to 1. After initial heating, the two components reacted and formed a homogenous solution. To complete esterification, the solution was heated for another 30 minutes in the water bath and was then diluted to 30% concentration with hot water (approximately 50° C.).

Aspen and white birch chips were utilized as the raw material. The chips were MG treated by spraying with calculated amounts of the aqueous MG solution to achieve loading rates of 1, 2, 3, 4, and 5% by weight for each of five samples. A sixth sample was used as a control in which the chips were not treated with the MG solution.

The MG treated chips were cooked under steam pressure at approximately 1000 kPa for 3–5 minutes and refined in a double revolving disc refiner having plate gaps ranging from 0.10 to 0.22 mm. Effect of MG content on parameters of refining showed that MG treatment of wood prior to refining reduced the energy requirements of the refining step.

To prepare the fiberboard panels, dry MG treated fibers were blended in appropriate quantities with additives including resin and wax to form a furnish. The furnish was formed into mats on a steel caul plate which were then hot pressed to form partially cured panels and post-heat treated to further cure the panels. Parameters used for panel production were as follows:

| | |
|---|---|
| Panel Size | ¾ in. × 21 in. × 24 in. |
| Target Board Density | 750 Kg/m³ |
| Resin Type | OSB face liquid PF resin modified with phenol-resorcinol-formaldehyde (PRF) resin (PF/PRF = 9/1 by weight) |
| Resin Content | 5% |
| Mat Moisture Content | 10% |
| Water Repellant | slack wax |
| Wax Content | 1% |
| Press Time | 5.5 minutes |
| Press Temperature | started at 210° C. for 1.5 minutes then 230° C. |
| Post-Heat | 0–5 hours at 145° C. |

The panels were tested for various physical properties including internal bond strength ("IB"), modulus of rupture in bending ("MOR") , modulus of elasticity in bending ("MOE"), thickness swelling after 24 hour water soak ("Th.S"), water absorption after 24 hour water soak ("WA"), and board density. It was found that, in general, both the heat treatment and MG treatment had significant positive effects on the properties of the experimental panels, Analysis showed that MOE and MOR increased with increasing heat treatment time but decreased with increasing MG content. IB increased with increasing heat treatment time and with increasing MG content up to 4%. Th.S. decreased with increasing heat treatment time and MG content but MG content had more significant effect on Th.S than heat treatment time. Delamination of the panels was encountered with fibers treated with 5% MG solution which suggest that high MG contents may interfere with a curing of the PF resin used. The best WA properties were found in panels with 3% MG content and heat treatment times between 3 and 4 hours.

The studies indicate that the positive and negative effects of MG solution on board quality resulted in an optimal MG content in the range of 2–3% where the MG was sprayed on the wood chips. Generally, treatment of the chips with MG prior to digesting and refining was found to markedly improve the dimensional stability and durability in water of the panels and exterior grade MDF were economically produced with 1–4% MG added.

EXAMPLE 2

An MG solution was prepared in a manner similar to that discussed in respect of Example 1. The ratio of maleic anhydride to glycerol by weight was 8:1, the impregnation liquor being diluted to 5.0 g maleic anhydride and 0.6 g glycerol per liter. Application of the MG to the wood chips was undertaken in a Prex*-impregnator. Three batches were prepared, the first being impregnated with 2.0% MG, the second with 0.75% MG and the third having no MG added.
*Trade-mark After impregnation, a Sunds Defibrator* of type ROP 20 equipped with refiner segments of type 5811601 was used for the fiber production. Wax was added to one-half of the chips having 0.75% MG content. The wax, paraffin dispersion Casco N-60 (30% concentration), was added into the Defibrator* infeed screw.
*Trade-mark PF resin was blowline blended with the fiber in the blowline between the Defibrator* and the dryer. The resin was a PF resin having a 7:3 mixture of Neste* BB610 and Borden* modified W838.
*Trade-mark The target resin content was 5% in all samples while the target wax content was 1% in the sample including wax.

From the dryer, the furnish was formed in to a fiber mat with dimensions 500 by 500 mm and were then prepressed for 60 seconds at a specific pressure of 1.5 MPa. The mats were then passed to the hot press which was run by computerized position and pressure control. The mat was pressed to 90 mm in the prepress and then passed to hot pressing at a temperature of 211° C. where the mats were pressed for 420 seconds resulting in a board thickness of 19 mm. The panels were then cut in two halves, one half of each being heat treated for 4 hours at 145° C.

The panels were tested for various physical properties including IB, MOR, MOE and percent swell after 24 hours and 7 day water soak. The boards were tested against control boards which included no MG. Analysis showed that MOE and MOR generally increased with heat treatment but decreased with increasing MG content (i.e. higher MOE and MOR was obtained with 0.75% MG than with 2.0% MG). IB increased with heat treatment but decreased with increasing MG content (i.e. IB was higher for 0.75% MG than for 2.0% MG). Percent swell, particularly for the 7 day water soak was markedly less in the boards containing 0.75% MG than in the boards containing no MG or those containing 2.0% MG. The boards containing 2.0% MG showed considerably less percent swell than those containing no MG. Neither heat treatment nor addition of wax was shown to markedly effect percent swell.

The study indicates that the positive and negative effects of MG solution on board quality resulted in an optimal MG content in the range of 0.33 to 0.75%.

As will be recognized by those skilled in the aft, the foregoing description of the present invention is intended to be by way of example only. Suitable substitutes for the various apparatus, materials and methods described, as generally known to those skilled in the art, are intended to be within the ambit of the invention as claimed.

I claim:

1. A process for manufacturing fiberboard from lignocellulosic material comprising the following steps:
   (a) apply a 0.1–5% by weight solution that includes maleic anhydride and glycerol to lignocellulosic material to form a treated lignocellulosic material wherein the ratio of maleic anhydride to glycerol is in the range of 2:1 to 9:1;
   (b) cook the treated lignocellulosic material in steam under pressure;
   (c) refine the cooked treated lignocellulosic material to form fibers;
   (d) mix the fibers with a binding resin to form a mixture;
   (e) form the mixture into a mat; and
   (f) hot press said mat to form a fiberboard.

2. A process according to claim 1 wherein 2–3% by weight of the solution is added to said lignocellulosic material by spraying the solution thereon.

3. A process according to claim 1 wherein 0.1–1.0% by weight of the solution is added to said lignocellulosic material by lignocellulosic impregnating the material with the solution.

4. A process according to claim 1 further including the step of adding 0.5–5% by weight of a water repellant to said treated lignocellulosic material.

5. A processing according to claim 1 wherein 1–12% by weight of said resin is added to said treated lignocellulosic material.

6. A process according to claim 5 wherein 5% by weight of said resin is added to said treated lignocellulosic material.

7. A process according to claim 1 further including the step of post-heating said board after hot-pressing.

8. A process according to claim 7 wherein said resin is a thermoplastic phenolic-formaldehyde resin.

9. A process according to claim 7 wherein said resin is a mixture of phenolic-formaldehyde and resorcinol-formaldehyde.

10. A process for manufacturing medium density fiberboard from lignocellulosic material comprising the following steps:
    (a) apply a 0.1–5% by weight solution that includes maleic anhydride and glycerol to lignocellulosic material to form a treated lignocellulosic material wherein the ratio of maleic anhydride to glycerol is in the range of 2:1 to 9:1;
    (b) cook the treated lignocellulosic material in steam under pressure;
    (c) refine the treated lignocellulosic material to form fibers;
    (d) add 0–5% water repellant to said fibers;
    (e) mix the fibers and water repellant with 3–12% binding resin to form a mixture;
    (f) form the mixture into a mat;
    (g) pre-press the mat in a press at room temperature; and
    (h) hot press said mat to form a fiberboard.

11. A process according to claim 10 wherein said resin is a thermoplastic phenolic-formaldehyde resin and further including the step of post-heating said fiberboard.

12. A fiberboard comprising a mixture of 64–92% by weight lignocellulosic fibers impregnated with a solution that includes 0.1–5% by weight maleic anhydride and glycerol and cooked in steam under pressure with subsequent addition of 0–5% water repellant and 3–12% binding resin.

13. A fiberboard according to claim 12 wherein said solution includes 0.1–1.0% maleic anhydride and glycerol.

14. The fiberboard according to claim 13 wherein said resin is a thermoplastic phenolic-formaldehyde resin.

* * * * *